United States Patent
Chen et al.

(10) Patent No.: US 11,967,128 B2
(45) Date of Patent: Apr. 23, 2024

(54) DECOMPOSITIONAL LEARNING FOR COLOR ATTRIBUTE PREDICTION

(71) Applicant: ADOBE INC., San Jose, CA (US)

(72) Inventors: Qiuyu Chen, Charlotte, NC (US); Quan Hung Tran, San Jose, CA (US); Kushal Kafle, Boston, MA (US); Trung Huu Bui, San Jose, CA (US); Franck Dernoncourt, San Jose, CA (US); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 239 days.

(21) Appl. No.: 17/333,583

(22) Filed: May 28, 2021

(65) Prior Publication Data

US 2022/0383031 A1    Dec. 1, 2022

(51) Int. Cl.
*G06V 10/56* (2022.01)
*G06F 16/51* (2019.01)
(Continued)

(52) U.S. Cl.
CPC .............. *G06V 10/56* (2022.01); *G06F 16/51* (2019.01); *G06F 16/532* (2019.01); *G06F 16/56* (2019.01); *G06F 16/5838* (2019.01); *G06V 10/25* (2022.01); *G06V 10/774* (2022.01); *G06V 10/82* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 2018/0025002 A1* | 1/2018 | Dorner | G06T 7/90 |
| | | | 382/165 |
| 2022/0138483 A1* | 5/2022 | Zhang | G06F 18/214 |
| | | | 382/176 |
| 2022/0245424 A1* | 8/2022 | Goyal | G06V 10/82 |

FOREIGN PATENT DOCUMENTS

| | | | | |
|---|---|---|---|---|
| CN | 105933762 A | * | 9/2016 | |
| KR | 20180038937 A | * | 4/2018 | |
| WO | WO-2005024662 A2 | * | 3/2005 | G06F 16/5838 |

OTHER PUBLICATIONS

Bello, I.—"Attention Augmented Convolutional Networks"—arXiv—Sep. 2019, pp. 1-13 (Year: 2019).*

(Continued)

*Primary Examiner* — Bernard Krasnic
(74) *Attorney, Agent, or Firm* — F. CHAU & ASSOCIATES, LLC

(57) ABSTRACT

The present disclosure describes a model for large scale color prediction of objects identified in images. Embodiments of the present disclosure include an object detection network, an attention network, and a color classification network. The object detection network generates object features for an object in an image and may include a convolutional neural network (CNN), region proposal network, or a ResNet. The attention network generates an attention vector for the object based on the object features, wherein the attention network takes a query vector based on the object features, and a plurality of key vector and a plurality of value vectors corresponding to a plurality of colors as input. The color classification network generates a color attribute vector based on the attention vector, wherein the color attribute vector indicates a probability of the object including each of the plurality of colors.

9 Claims, 8 Drawing Sheets

(51) Int. Cl.
G06F 16/532 (2019.01)
G06F 16/56 (2019.01)
G06F 16/583 (2019.01)
G06V 10/25 (2022.01)
G06V 10/774 (2022.01)
G06V 10/82 (2022.01)

(56) References Cited

OTHER PUBLICATIONS

Chun, Y.—"A Novel Clothing Attribute Representation Network-Based Self-Attention Mechanism"—IEEE—Nov. 2020, pp. 1-8 (Year: 2020).*
1Chen, "Representation Learning of Image Recognition: Diversity, Aspect Ratio, Invariance, and Composition", Available from Dissertations & Theses @ University of North Carolina Charlotte; ProQuest Dissertations & Theses Global. (2528837685). https://librarylink.uncc.edu/login?url=https://www-proquest-com.librarylink.uncc.edu/dissertations-theses/representation-learning-image-recognition/docview/2528837685/se-2? accountid=14605, 170 pages, 2021.
2Bello, et al., "Attention Augmented Convolutional Networks" In Proceedings of the IEEE International Conference on Computer Vision, 2019, pp. 3286-3295.
3Bourdev, et al., "Describing People: A Poselet-Based Approach to Attribute Classification", In 2011 International Conference on Computer Vision, pp. 1543-1550, IEEE.
4Carion, et al., "End-to-End Object Detection with Transformers", In European Conference on Computer Vision (ECCV), 26 pages, arXiv:2005.12872v3 [cs.CV] May 28, 2020.
5Chen, et al., "UNITER: UNiversal Image-TExt Representation Learning", In European Conference on Computer Vision, pp. 104-120, Springer, 26 pages, arXiv:1909.11740v3 [cs.CV] Jul. 17, 2020.
6Park, et al., "Attend to You: Personalized Image Captioning with Context Sequence Memory Networks", In Proceedings of the IEEE conference on computer vision and pattern recognition, 2017, pp. 895-903.
7Deng, et al., "Pedestrian Attribute Recognition At Far Distance", In Proceedings of the 22nd ACM international conference on Multimedia, pp. 789-792, 2014.
8Foster, "Color constancy", Vision Research 51 (2011) 674-700.
9He, et al., "Mask R-CNN", In Proceedings of the IEEE International Conference on Computer Vision, pp. 2961-2969, 2018.
10Hu, et al., "Relation Networks for Object Detection", In Proceedings of the IEEE Conference on Computer Vision and Pattern Recognition, pp. 3588-3597, 2018.
11Hwang, et al., "Sharing Features Between Objects and Their Attributes", In CVPR 2011, pp. 1761-1768, 2011, IEEE.
12Krishna, et al., "Visual Genome: Connecting Language and Vision Using Crowdsourced Dense Image Annotations", International Journal of Computer Vision, 123(1):32-73, 2017.
13Lampert, et al. "Learning To Detect Unseen Object Classes by Between-Class Attribute Transfer", In 2009 IEEE Conference on Computer Vision and Pattern Recognition, pp. 951-958, IEEE.
14Li, et al., "Symmetry and Group in Attribute-Object Compositions", In Proceedings of the IEEE/CVF Conference on Computer Vision and Pattern Recognition, pp. 11316-11325, 2020.
15Lin, et al., "Improving Person Re-identification by Attribute and Identity Learning", Pattern Recognition, 95:151-161, arXiv:1703.07220v3 [cs.CV] Jun. 9, 2019.
16Liu, et al., "Deep Learning Face Attributes in the Wild", In Proceedings of the IEEE International Conference on Computer Vision (ICCV), 2015, pp. 3730-3738.
17Lu, et al., "ViLBERT: Pretraining Task-Agnostic Visiolinguistic Representations for Vision-and-Language Tasks", In Advances in Neural Information Processing Systems, pp. 13-23, arXiv: 1908.02265v1 [cs.CV] Aug. 6, 2019.
18Lu, et al., "12-in-1: Multi-Task Vision and Language Representation Learning", In Proceedings of the IEEE/CVF Conference on Computer Vision and Pattern Recognition, pp. 10437-10446, 2020.
19Mahajan, et al., "A Joint Learning Framework for Attribute Models and Object Descriptions", In 2011 International Conference on Computer Vision, pp. 1227-1234, IEEE.
20Miller, et al., "Key-Value Memory Networks for Directly Reading Documents", In Proceedings of the 2016 Conference on Empirical Methods in Natural Language Processing, EMNLP 2016, Austin, Texas, USA, Nov. 1-4, 2016, pp. 1400-1409, The Association for Computational Linguistics, arXiv:1606.03126v2 [cs.CL] Oct. 10, 2016.
21Misra, et al., "From Red Wine to Red Tomato: Composition with Context", In Proceedings of the IEEE Conference on Computer Vision and Pattern Recognition, pp. 1792-1801, 2017.
22Nan, et al., "Recognizing Unseen Attribute-Object Pair with Generative Model", In Proceedings of the AAAI Conference on Artificial Intelligence, vol. 33, pp. 8811-8818, 2019.
23Oh, et al., "Video Object Segmentation using Space-Time Memory Networks", In Proceedings of the IEEE International Conference on Computer Vision, pp. 9226-9235, 2019.
24Patterson, et al., "COCO Attributes: Attributes for People, Animals, and Objects", In European Conference on Computer Vision, pp. 85-100, Springer, 2016.
25Purushwalkam, et al., "Task-Driven Modular Networks for Zero-Shot Compositional Learning", In Proceedings of the IEEE International Conference on Computer Vision, pp. 3593-3602, 2019.
26Ren, et al., "Faster R-CNN: Towards Real-Time Object Detection with Region Proposal Networks", IEEE transactions on pattern analysis and machine intelligence, 39(6):1137-1149, arXiv:1506.01497v3 [cs.CV] Jan. 6, 2016.
27Soomro, et al., "UCF101: A Dataset of 101 Human Actions Classes From Videos in The Wild", Center for Research in Computer Vision, 2(11), 7 pages, arXiv:1212.0402v1 [cs.CV] Dec. 3, 2012.
28Sukhbaatar, et al., "End-To-End Memory Networks", In Advances in neural information processing systems, pp. 2440-2448, arXiv:1503.08895v5 [cs.NE] Nov. 24, 2015.
29Sun, et al., "VideoBERT: A Joint Model for Video and Language Representation Learning", In Proceedings of the IEEE International Conference on Computer Vision, pp. 7464-7473, 2019.
30Wang, et al., "Non-local Neural Networks", In Proceedings of the IEEE conference on computer vision and pattern recognition, pp. 7794-7803, 2018.
31Xiao, et al., "SUN Database: Large-scale Scene Recognition from Abbey to Zoo", In 2010 IEEE computer society conference on computer vision and pattern recognition, pp. 3485-3492, IEEE.
32Xie, et al., "Aggregated Residual Transformations for Deep Neural Networks", In Proceedings of the IEEE conference on computer vision and pattern recognition, pp. 1492-1500, 2017.
33Yang, et al., "Learning Dynamic Memory Networks for Object Tracking", In Proceedings of the European Conference on Computer Vision (ECCV), pp. 152-167, 2018.
34Zhao, et al., "Exploring Self-attention for Image Recognition", In Proceedings of the IEEE/CVF Conference on Computer Vision and Pattern Recognition, pp. 10076-10085, 2020.

* cited by examiner

DECOMPOSITIONAL LEARNING FOR COLOR ATTRIBUTE PREDICTION

BACKGROUND

The following relates generally to image processing, and more specifically to color classification.

Image processing, or digital image processing, is the use of a computer to obtain information from or digitally adjust an image (e.g., to obtain a more aesthetically pleasing image). For example, the content of an image can be identified using a machine learning model.

Color classification is form of image processing that includes identifying specific colors in an image. In some cases, the colors of an image can be used for indexing and searching for the image in a database.

However, in some cases color classification can identify colors in an image that are different from the colors that a human user would describe. Thus, the results of an image search by color could be different from what the user expects. Therefore, there is a need in the art for systems and methods to detect colors in an image as a human user would perceive them.

SUMMARY

Some embodiments of the present disclosure include a model used for color prediction of objects identified in an image. Embodiments of the present disclosure perform color recognition and prediction using a machine learning model. An example model architecture includes an attention network that uses key vectors representing specific colors. The output of the model may include a description of the colors in an image that more closely corresponds to what a human user would perceive. Accurate color attributes can be used in image search and other image processing applications.

A method, apparatus, non-transitory computer readable medium, and system for color classification are described. One or more embodiments of the method, apparatus, non-transitory computer readable medium, and system include computing object features for an object in an image, computing a query vector based on the object features, computing a key vector and a value vector corresponding to each of a plurality of colors, generating an attention vector for the object using the query vector, the key vector and the value vector as input, generating a color attribute vector based on the attention vector, wherein the color attribute vector indicates a probability of the object including each of the plurality of colors, and transmitting information indicating one of the plurality of colors for the object based on the color attribute vector.

An apparatus, system, and method for color classification are described. One or more embodiments of the apparatus, system, and method include an object detection network configured to generate object features for an object in an image, an attention network configured to generate an attention vector for the object based on the object features, wherein the attention network takes a query vector based on the object features, and a plurality of key vector and a plurality of value vectors corresponding to a plurality of colors as input, and a color classification network configured to generate a color attribute vector based on the attention vector, wherein the color attribute vector indicates a probability of the object including each of the plurality of colors.

A method, apparatus, non-transitory computer readable medium, and system for color classification are described. One or more embodiments of the method, apparatus, non-transitory computer readable medium, and system include identifying a training set including an image representing an object and a ground truth color attribute for the image, computing object features for an object in an image using an object detection network, computing a query vector based on the object features, computing a key vector and a value vector corresponding to each of a plurality of colors, generating an attention vector for the object using an attention network taking the query vector, the key vector and the value vector as input, generating a color attribute vector using a color classification network based on the attention vector, wherein the color attribute vector indicates a probability of the object including each of the plurality of colors, computing a prediction loss based on the ground truth color attribute and the color attribute vector, and adjusting weights of the attention network based on the prediction loss.

DETAILED DESCRIPTION

Figure 1:
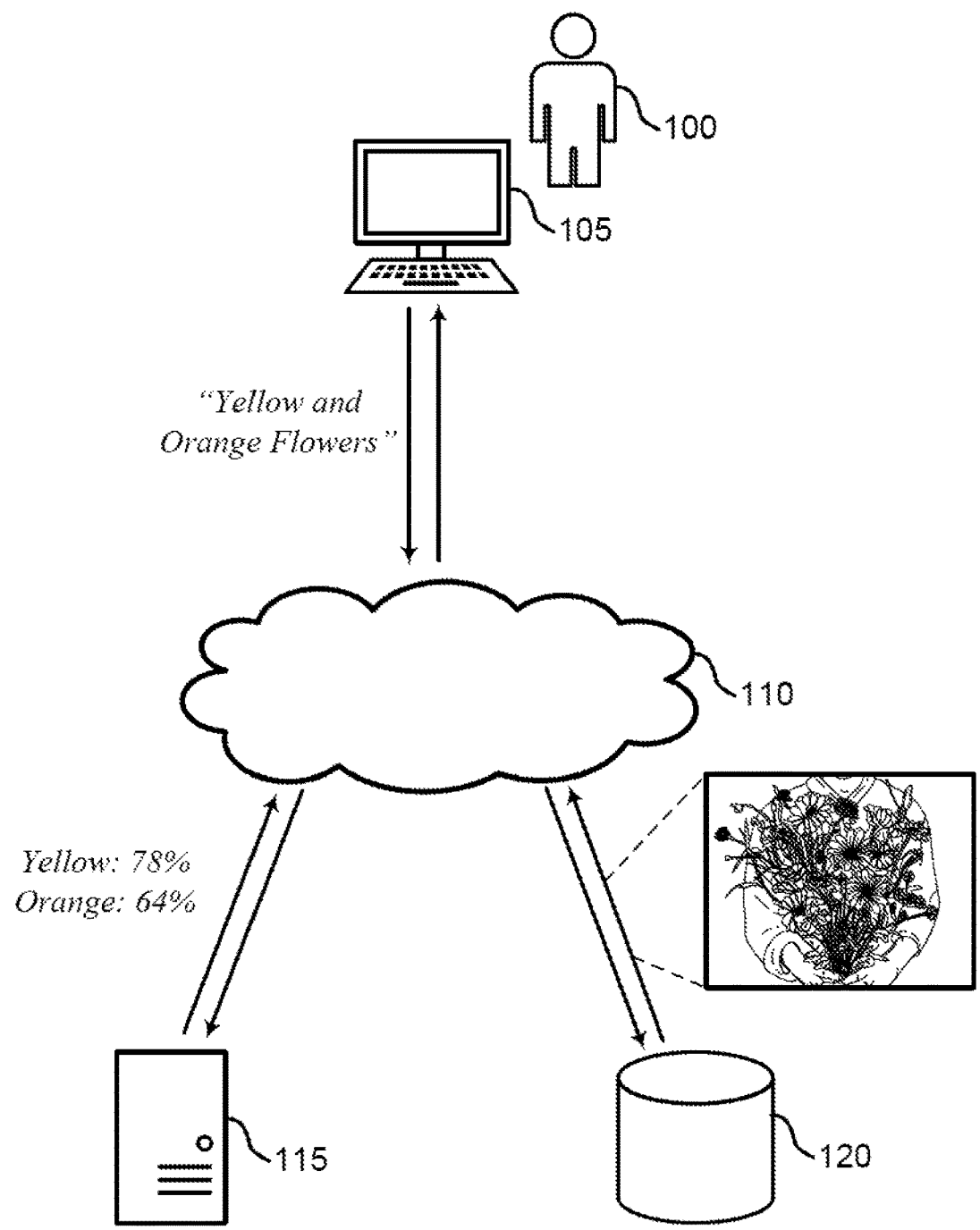
FIG. 1 shows an example of a color classification system according to aspects of the present disclosure.

The present disclosure describes systems and methods for color classification. According to some embodiments, an attribute prediction model is used to extract the features of objects from an image. The features may represent colors, edges, ridges, or objects in the image. Embodiments of the disclosure include a system for color attribute prediction based on the detected features, where the color attributes correspond to colors that a human user would perceive in the image.

Color recognition is the process of a computer system comprehending a color using machine learning. Color attribute prediction is a subclass of color recognition, and of general attribute prediction. Attribute recognition, including color attribute prediction, can be used in various domains such as recognizing face attributes, people attributes, pedestrian attributes, action, etc. Supervised, unsupervised, or semi-supervised systems can be trained to understand a color in an image or color palette using a training dataset and output a natural language color to a user stating the colors in the image. In an example scenario, an image editing software can recognize the color green in trees.

In some cases, it is desirable to detect colors in an image as a human user would perceive them (i.e., as described using a natural language description of the image). As such, natural language processing (NLP) techniques can be used in computer vision systems. For example, NLP may be used for generating image captions that include a description of the colors in an image. For example, an image caption may read "a person holding yellow and orange flowers."

However, conventional systems for detecting the colors of an image do not provide results that are consistent with the perceptions of a human user. For example, perceived color may depend on things like background colors, neighboring colors, and even the semantic context of an image (i.e., what color a user expects an object to be). Furthermore, the colors identified by conventional color detection methods may not correspond properly to objects in the image. Thus, for example, if a user searches for images that have yellow and orange flowers, a search engine that relies on conventional color detection systems may provide search results that do not appear to include yellow or orange flowers to the user.

Embodiments of the present disclosure include a system for color recognition and prediction that provides results consistent with human perceptions. In some embodiments, a supervised convolutional neural network is used with a composite backbone network to extract object features from an image, and from a number of color images (e.g., single color images). The image features and the color image features are provided as input to an attention network (with the color image features serving as key vectors). The output of the attention network is classified with one or more colors. Since the object features detected by the object detection network can include representations of objects, the colors can take into account object types (i.e., the semantic content of the image) when predicting colors.

According to embodiments of the present disclosure, a subset of attribute prediction research, zero-shot compositional learning (ZSCL), can be used where the test set consists of object-attribute pairs that are not found in a training set. The algorithm learns to decouple and compose objects and attributes to properly generalize to ZSCL setting. The relationship and interaction learning between objects and attributes, such as in ZSCL, can be helpful for color recognition.

A network that includes an attention network can be referred to as a memory network. Memory networks can be applied for a number of applications, such as document question and answers (Q&A), where memorable information is separately embedded into keys (i.e., input) and values (i.e., output) feature vectors. Keys address relevant memories whose corresponding values are returned. In embodiments of the present disclosure, memory networks are used for color attribute recognition. In some embodiments, the attention module (aka, the memory network) operates by anchoring the attention prediction with reference to known color priors.

Figure 2:
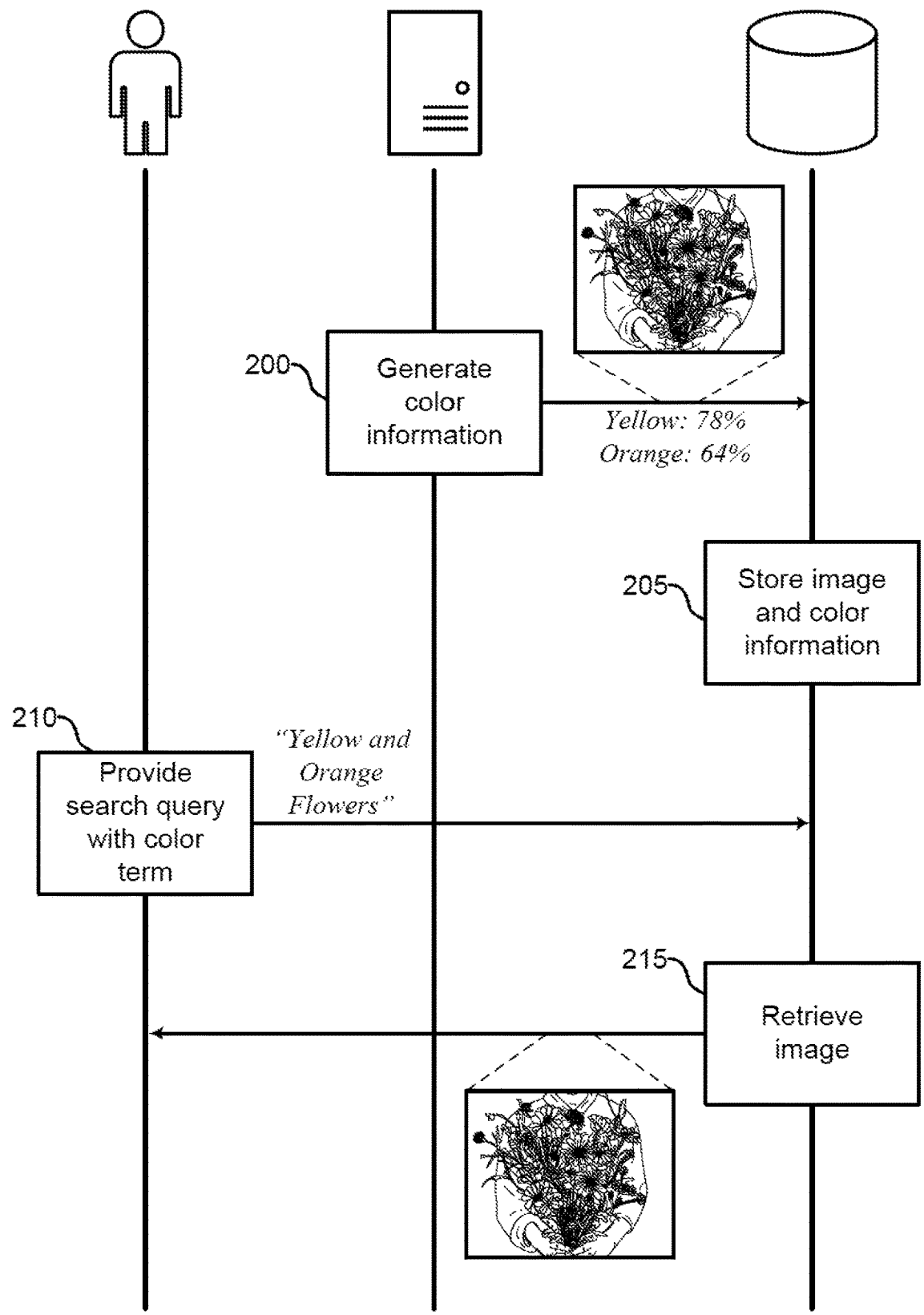
FIG. 2 shows an example of a color classification process according to aspects of the present disclosure.
Figure 3:
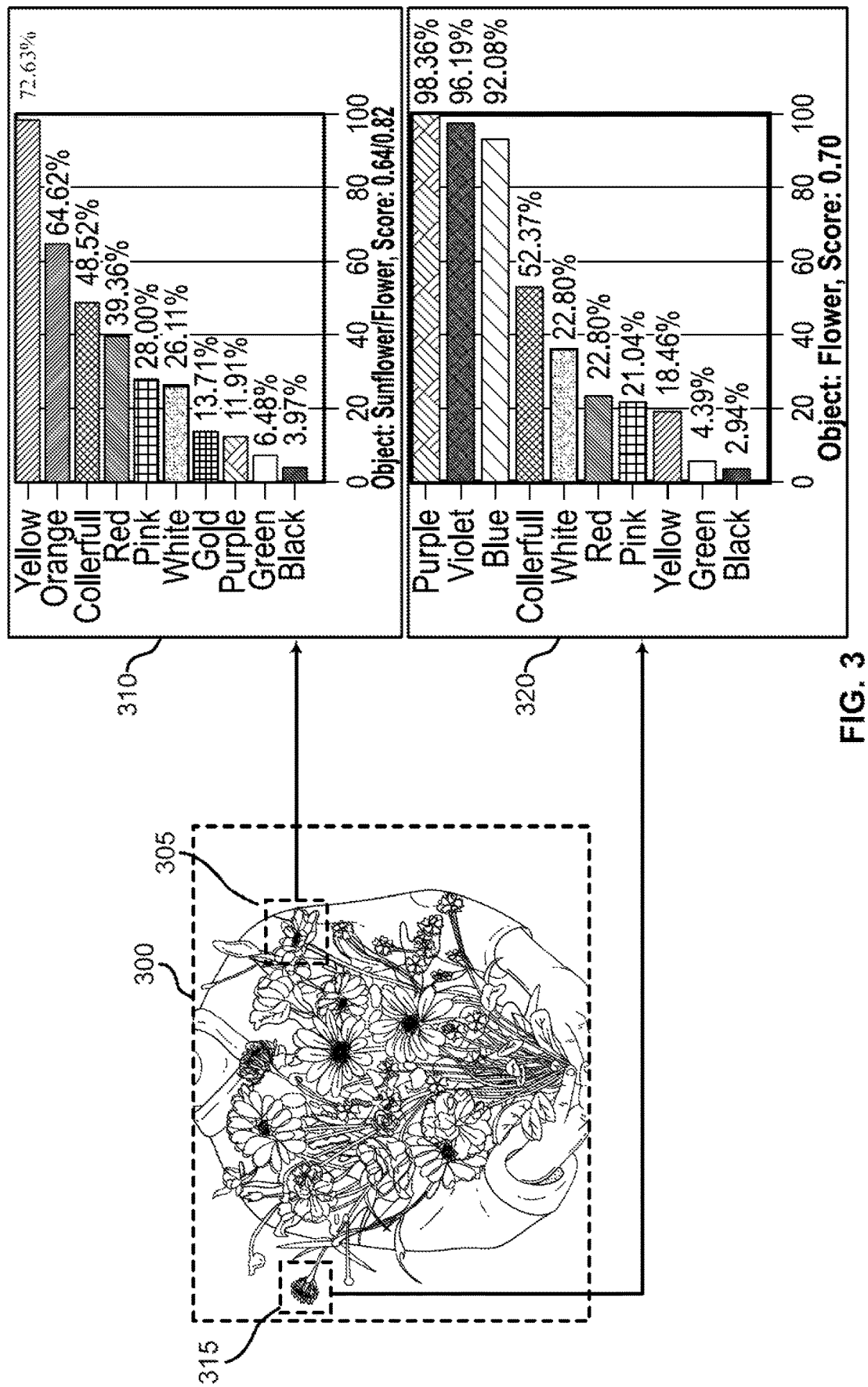
FIG. 3 shows an example of a color attribute prediction according to aspects of the present disclosure.
Figure 4:
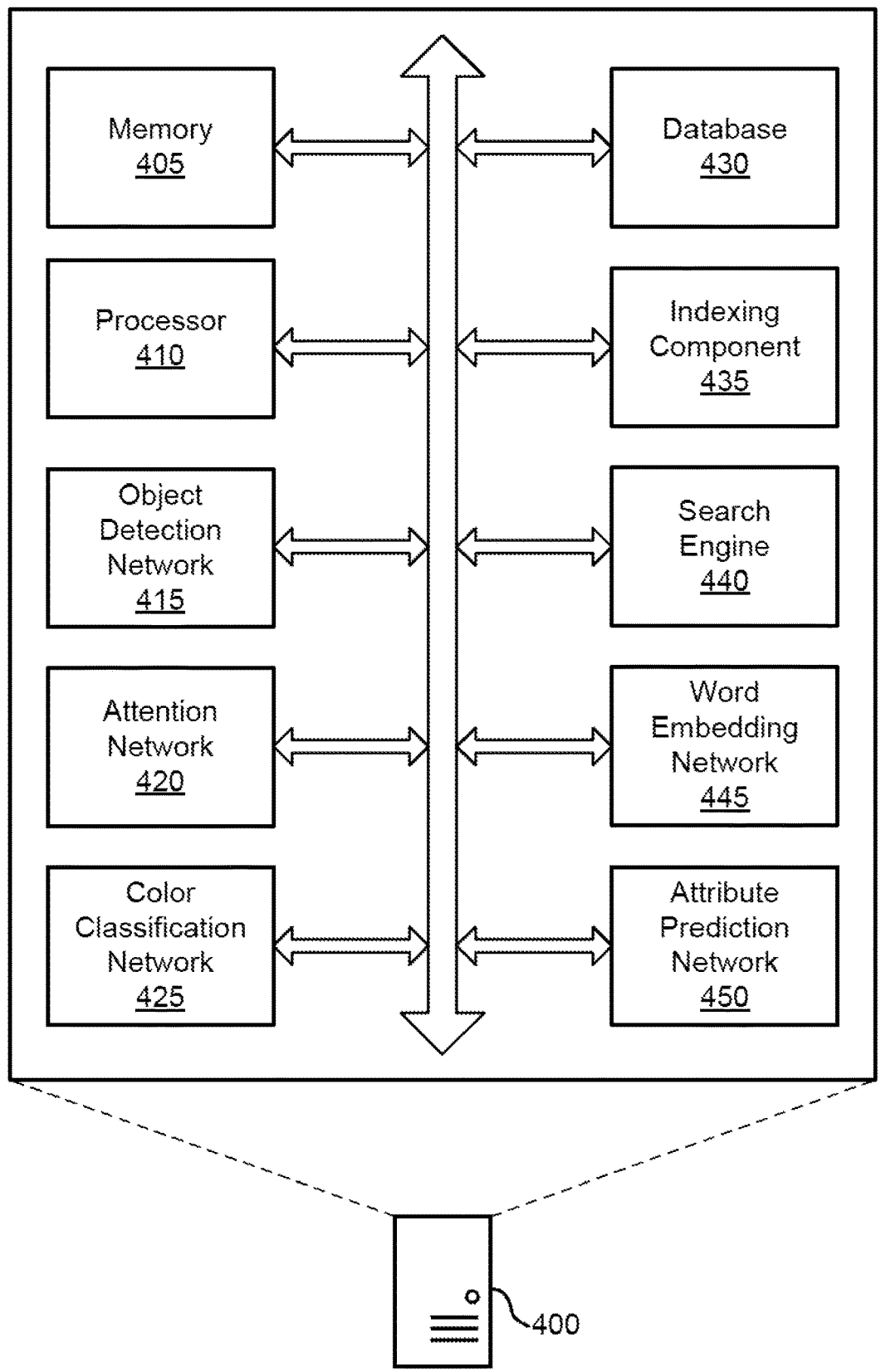
FIG. 4 shows an example of a color classification apparatus according to aspects of the present disclosure.
Figure 5:
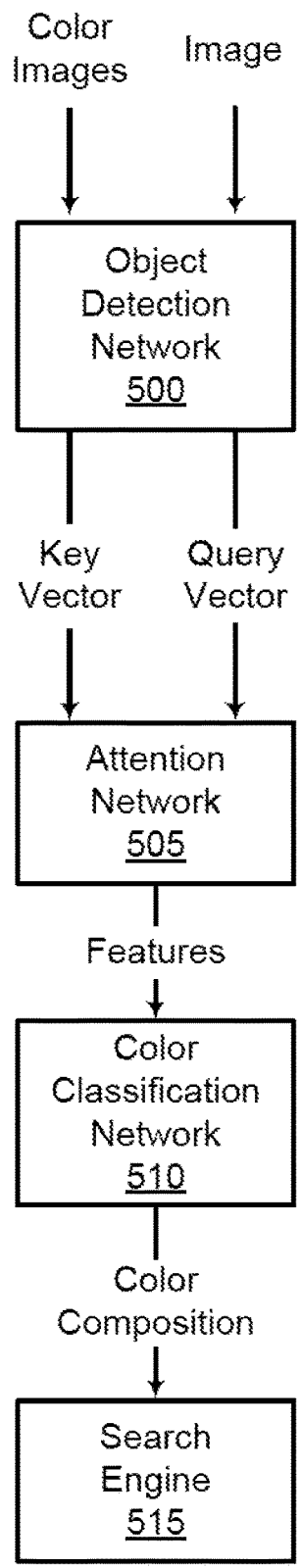
FIG. 5 shows an example of a color classification system architecture according to aspects of the present disclosure.
Figure 6:
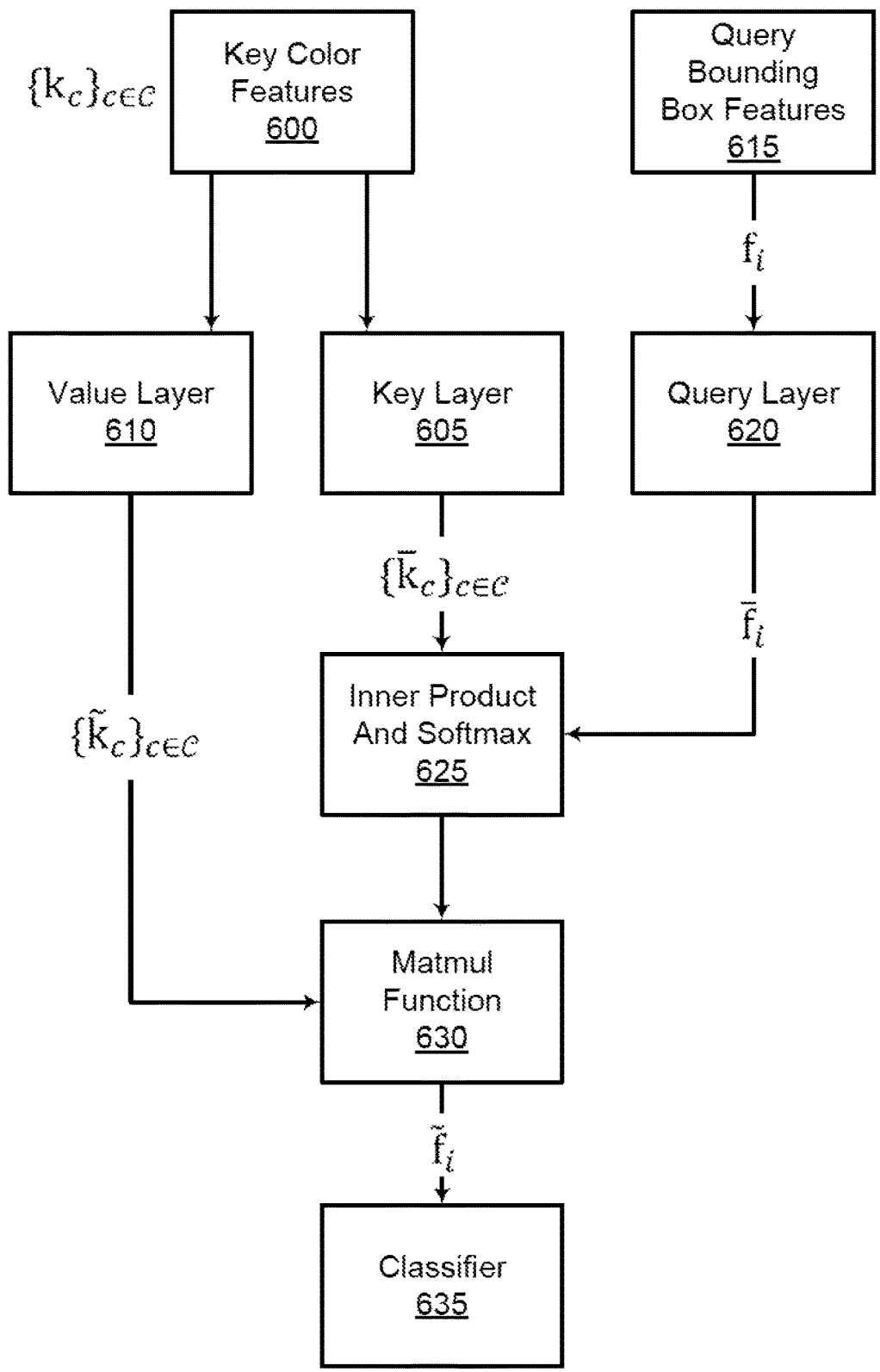
FIG. 6 shows an example of an attention network according to aspects of the present disclosure.
Figure 7:
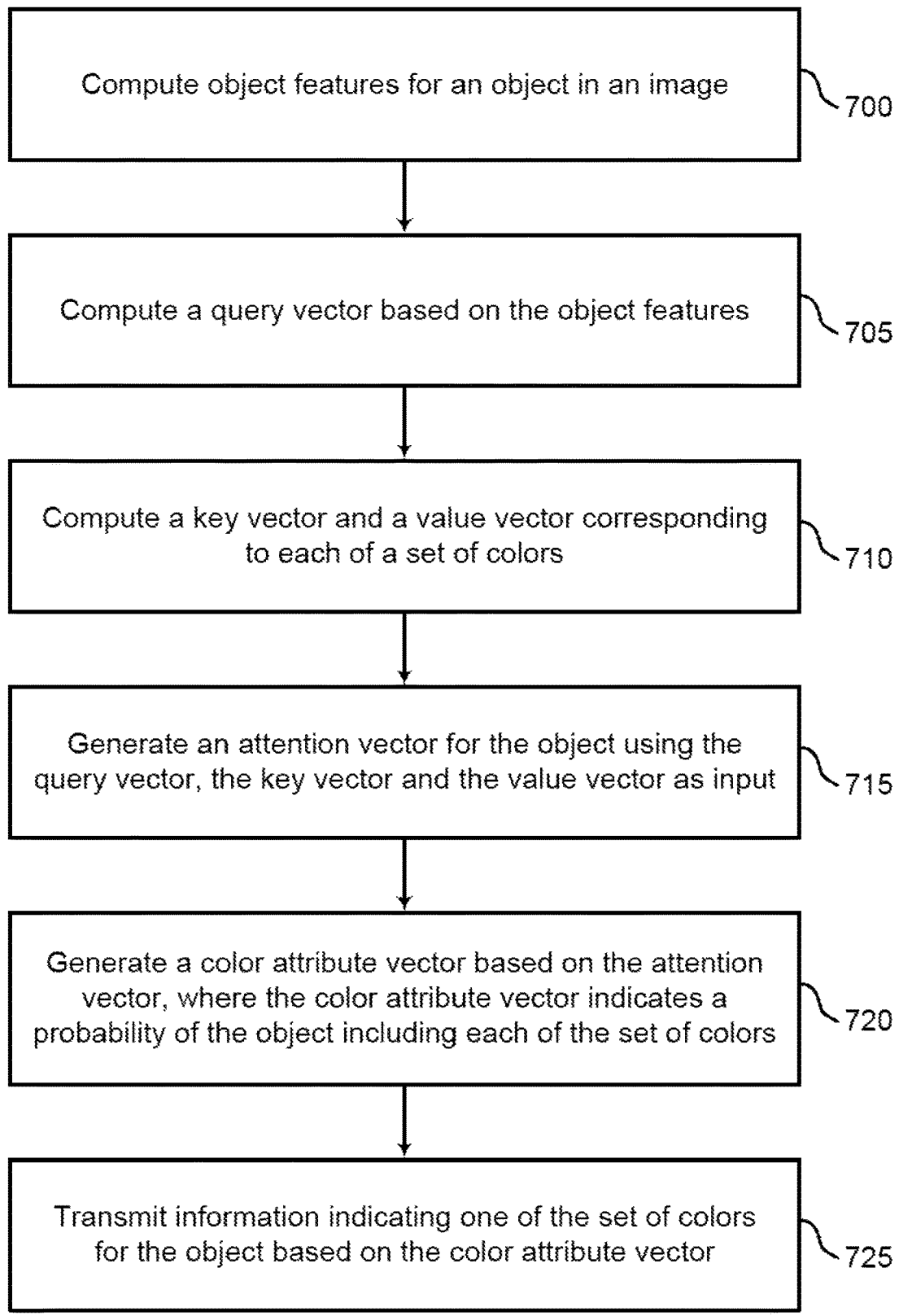
FIG. 7 shows an example of a process for information transmission of a color classification system according to aspects of the present disclosure.
Figure 8:
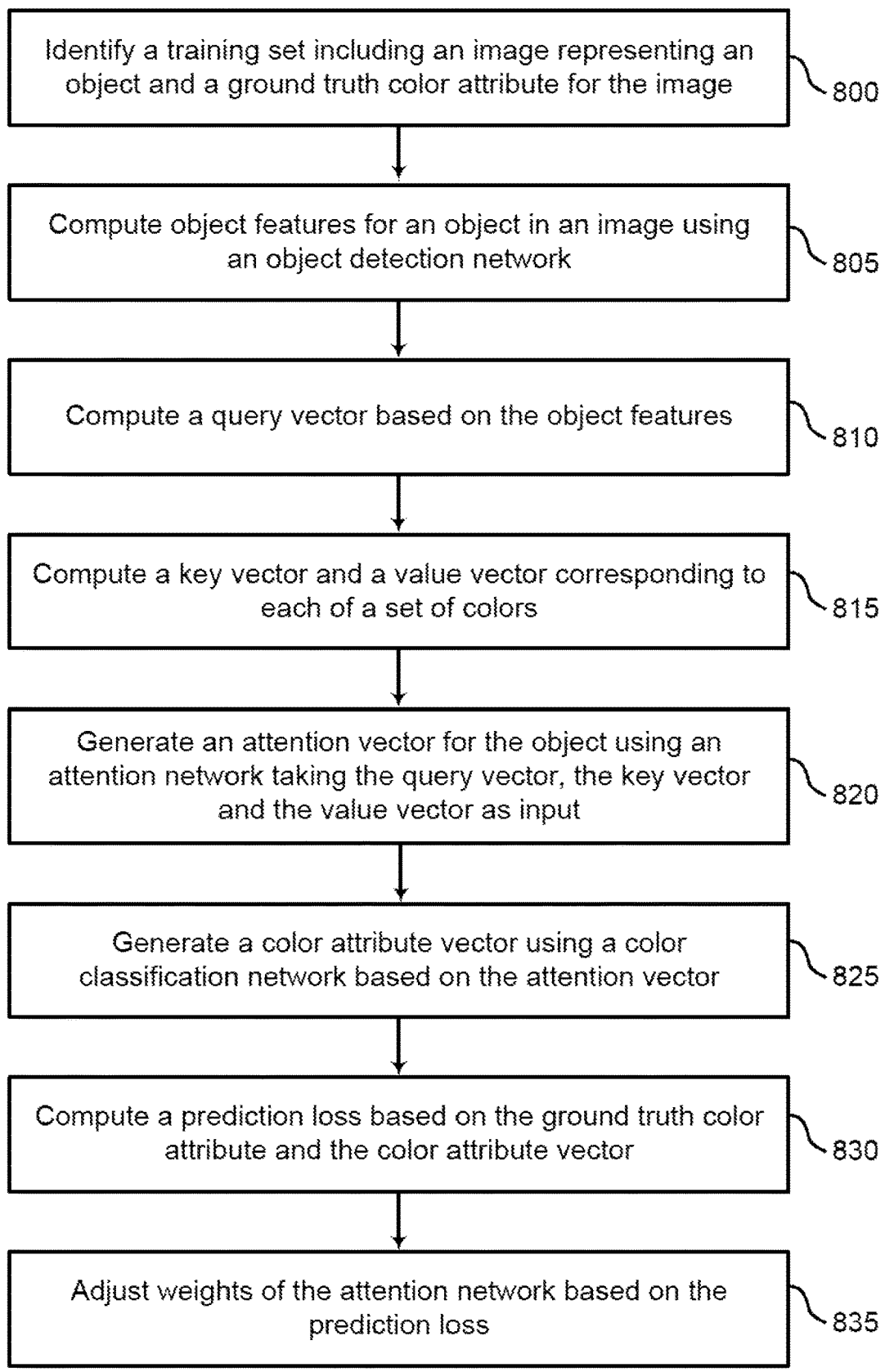
FIG. 8 shows an example of training a color classification system according to aspects of the present disclosure.

Color attribute recognition and other computer vision tasks can be applied to, for example, personalized image captioning, visual tracking, video processing, image classification, object detection and vision-language tasks. In FIGS. 1-3, embodiments of the present disclosure are described with reference to an image search application. In FIGS. 4-6, examples of an architecture for a color classification system are described. In FIG. 7, examples of a color classification method is described. In FIG. 8, examples of a method of training a color classification system are described.

Color-Based Image Search

FIG. 1 shows an example of a color classification system according to aspects of the present disclosure. The example shown includes user 100, user device 105, cloud 110, color classification apparatus 115, and database 120.

In the example scenario of FIG. 1, an image is provided from the database 120 to the color classification apparatus 115 via a cloud 110 (i.e., for indexing). Alternatively, an image may be provided to the color classification apparatus 115 by a user 100. In some cases, the image may be a JPEG, RAW, HEIC, or any other image file, although the present disclosure is not limited to any particular image format.

The color classification apparatus 115 computes object features, and in some cases, a bounding box around one or more detected objects. The color classification apparatus 115 then produces a breakdown of the colors found in the object (e.g., within the bounding box of a detected object). The colors may then be indexed for natural language search using a search engine. In some cases, the colors are associated with tags corresponding to the objects detected in the image.

A user 100 provides a query relating to one or more colors using a search engine, via a cloud 110. For example, the user 100 may search for a color using natural language text in the search engine, and search results corresponding to the colors or image are then provided to the user 100 via the cloud 110 and user interface 105. In some cases, the results are provided to the user 100 without a cloud 110 or bypasses the cloud 110.

In some cases, the color classification apparatus 115 may communicate with the database 120 via the cloud 110. The database 120 may also communicate with the user 100 via the cloud 110 and user interface 105. For example, the user 100 may retrieve an image from the database 120 via the cloud 110 and user interface 105. Additionally, or alternatively, the image may be store on the user interface 105 or image may be retrieved directly from the database 120, bypassing the cloud 110.

A user device 105 may enable a user 100 to interact with a device. In some cases, the user device may include an external display device such as a display screen, or an input device (e.g., remote control device interfaced with the user device 105 directly or through an IO controller module). In some cases, a user device 105 may include a graphical user interface (GUI). According to some embodiments, user device 105 includes a software application that enables image search (i.e., a search engine).

The user device 105 may be a personal computer, laptop computer, mainframe computer, palmtop computer, personal assistant, mobile device, or any other suitable processing apparatus. In some examples, the user device 105 includes software that incorporates an image-tagging system and an object detection system (i.e., an image editing software).

A cloud 110 is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Color classification apparatus 115 computes object features for an object in an image, computes a query vector based on the object features, and computes a key vector and a value vector corresponding to each of a plurality of colors. Then, the Color classification apparatus 115 generates an attention vector for the object using the query vector, the key vector and the value vector as input, generates a color attribute vector based on the attention vector, and generates a color attribute vector based on the attention vector. The Color classification apparatus 115 may then transmit information indicating one of the plurality of colors for the object based on the color attribute vector. Color classification apparatus 115 is an example of, or includes aspects of, the corresponding element described with reference to FIG. 4.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction. According to some embodiments, database 120 is configured to store images. Database 120 is an example of, or includes aspects of, the corresponding element described with reference to FIG. 4.

FIG. 2 shows an example of a color classification process according to aspects of the present disclosure. The example shown includes the color classification system generating color information and sends an image and the color classification to the database. The database then stores the image and color information. A user provides a search query with a color term and the database returns an image to the user.

Color is a fundamental attribute in visual understanding of systems in the digital era. Color is a property used to describe an image and is useful for image search. Digital image libraries include an enormous and increasing number of images, for example, a digital library contained 10 billion images in 2010 and four trillion images in 2020. Digital images are used for accurate and scalable training of color prediction models and for color-based indexing and search tasks.

In some cases, a user may use an image search system to perform an attribute-based image search that returns relevant objects identified in images and predict attributes of the objects. Such object searches may be used in various platforms, such as recognition of face attributes, pedestrian attributes, actions, etc.

Color depends on human perception and language. Color perception by humans ranges from color-shift due to luminance changes to the human ability to maintain color constancy despite changes in the illuminant. Human language concepts for colors are diverse, i.e., people give different names to the perceived colors. One or more embodiments of the present disclosure train a model to predict colors that agree with a majority of users.

Color recognition has unique properties, for example, color classes admit more consistent visual forms. Thus, an understanding of color is used in the recognition model by giving a typical example (i.e., prototype) of each color. Furthermore, different colors can be achieved through mixing and transforming key colors. Therefore, a model can recognize the relative similarity between color classes if the model learns the relation between the object in question and prior colors. An attention-based architecture is used in the model which outperforms the baseline.

In the example scenario of FIG. 2, at operation 200, the color classification system generates color information of an image and sends an image and the color classification to the database. Alternatively, an image may be uploaded to the color classification system via a database. The image file may be a JPEG, RAW, HEIC, or any other image file as the present disclosure is not limited thereto.

At operation 205, the database stores the image and color information. The image and color information may be indexed in the database for a search function, such as a search engine.

At operation 210, the user provides a search query with one or more color term to search the database for a particular color in an image, or images with a particular color. For example, if the user requests "yellow and orange flowers", the system returns an image with a high percentage yield of yellow and orange flower.

At operation 215, the database returns an image to the user based on the query.

FIG. 3 shows an example of a color attribute prediction system according to aspects of the present disclosure. In some cases, the color attribute prediction system includes an image 300, a first object 305, and a second object 315. The first and second objects may be detected using an object detection network. In one embodiment, image 300 includes first object 305 and second object 315. In one embodiment, first object 305 includes first color attribute prediction 310. In one embodiment, second object 315 includes second color attribute prediction 320.

In the example of FIG. 3, the first object 305 may be a sunflower. The sunflower includes few basic colors, primarily yellow. As shown in the first color attribute prediction 310 the system may determine a breakdown of colors in the bounding box, where yellow fills the majority of the bounding box.

In the example of FIG. 3, the second object 315 may be a tulip. The tulip includes few basic colors, primarily purple. As shown in the second color attribute prediction 320 the system may determine a breakdown of colors in the bounding box, where purple fills the majority of the bounding box.

The first color attribute prediction 310 includes several colors that are determined to be inside the bounding box. In the example of the first color attribute prediction 310 of FIG. 3, the sunflower fills most of the bounding box, therefore yellow will be determined as the highest percentage in the bounding box. Other colors such as orange, red, and pink may be determined as colors inside the bounding box but may or may not be associated with the sunflower. In some cases, the system may determine a color to be colorful, where no color is assigned. Rather, multiple colors may be assigned.

The second color attribute prediction 320 includes several colors that are determined to be inside the bounding box. In the example of the second color attribute prediction 320 of FIG. 3, the tulip fills most of the bounding box, therefore purple will be determined as the highest percentage in the bounding box. Other colors such as violet, blue, and white may be determined as colors inside the bounding box but may or may not be associated with the tulip. In some cases, the system may determine a color to be colorful, where no color is assigned. Rather, multiple colors may be assigned.

Architecture

An apparatus, system, and method for color classification are described. One or more embodiments of the apparatus, system, and method include an object detection network configured to generate object features for an object in an image, an attention network configured to generate an attention vector for the object based on the object features, wherein the attention network takes a query vector based on the object features, and a plurality of key vector and a plurality of value vectors corresponding to a plurality of colors as input, and a color classification network configured to generate a color attribute vector based on the attention vector, wherein the color attribute vector indicates a probability of the object including each of the plurality of colors.

In some examples, the object detection network comprises a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, the object detection network comprises a region proposal network (RPN). A RPN is a fully convolutional network that can predict object bounds and object scores at one or more positions. The RPN is trained to generate high-quality region proposals. RPNs can be merged into a single network by sharing convolutional features. Using the terminology of neural networks with attention mechanisms, the RPN component tells the unified network where to look. RPNs are designed to predict region proposals with a wide range of scales and aspect ratios. RPNs use anchor boxes that serve as references at multiple scales and aspect ratios. A scheme can be thought of as a pyramid of regression references, which avoids enumerating images or filters of multiple scales or aspect ratios.

In some examples, the object detection network comprises a residual neural network (ResNet). A ResNet is a neural network architecture that addresses issues associated with training deep neural networks. It operates by including identity shortcut connections that skip one or more layers of the network. In a ResNet, stacking additional layers doesn't degrade performance or introduce training errors because skipping layers avoids the vanishing gradient problem of deep networks. In other words, the training gradient can follow "shortcuts" through the deep network. Weights are adjusted to "skip" a layer and amplify a previous skipped layer. In an example scenario, weights for an adjacent layer are adjusted and weights are not applied to an upstream layer.

In some examples, the attention network comprises a multi-head network with 16 attention heads. A Multi-head Attention network is used for attention mechanisms, where the Multi-head Attention network performance calculations to an attention mechanism several times in parallel. Independent attention outputs are then concatenated and transformed into the expected dimension.

Some examples of the apparatus, system, and method described above further include a database configured to store images. Some examples further include an indexing component configured to index the images based on the color attribute vector. Some examples further include a search engine configured to search the indexed images based on the color attribute vector.

Some examples of the apparatus, system, and method described above further include a word embedding network configured to encode object labels. Some examples further include an attribute prediction network configured to predict object labels, wherein the object detection network is trained by comparing the encoded object labels and the predicted object labels.

FIG. 4 shows an example of a color classification apparatus 400 according to aspects of the present disclosure. Color classification apparatus 400 is an example of, or includes aspects of, the corresponding element described with reference to FIG. 1. In one embodiment, color classification apparatus 400 includes memory 405, processor 410, object detection network 415, attention network 420, color classification network 425, database 430, indexing component 435, search engine 440, word embedding network 445, and attribute prediction network 450.

Examples of a memory 405 include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A processor 410 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special-purpose components for modem processing, baseband processing, digital signal processing, or transmission processing.

According to some embodiments, object detection network 415 computes object features for an object in an image, computes image features for the image, and identifies a bounding box for the object, where the object features are computed based on the image features and the bounding box. Additionally, or alternatively, object detection network 415 performs region-of-interest pooling on the image features based on the bounding box, where the object features are based on the region-of-interest pooling. The object detection network 415 may also identify a single-color image for each of the set of color and generates color features based on each of the set of single-color images, where the key vector and the value vector are based on the color features. The object detection network 415 may also identify a set of objects having an object attribute corresponding to a color and generate object features for each of the set of objects. Object features may be extracted from ground-truth bounding boxes using a convolutional neural network. Object features extracted are object-aware and background-excluded.

According to some embodiments, object detection network 415 is configured to generate object features for an object in an image. In some examples, the object detection network 415 includes a convolutional neural network (CNN), a region proposal network, or a residual neural network.

According to some embodiments, object detection network 415 identifies a training set including an image representing an object and a ground truth color attribute for the image. In some examples, object detection network 415 computes object features for an object in an image using an object detection network 415. In some examples, object detection network 415 generates image features using the object detection network 415. The object detection network 415 may be either software or hardware and can be stored in a memory or a combination of programs or include an application specific integrated circuit or other hardware implementation. Object detection network 415 is an example of, or includes aspects of, the corresponding element described with reference to FIG. 5.

According to some embodiments, attention network 420 computes a query vector based on the object features and computes a key vector and a value vector corresponding to each of a set of colors. Additionally, or alternatively, the attention network 420 generates an attention vector for the object using the query vector, the key vector and the value vector as input, the key vector and the value vector are computed independent of the image. In some examples, attention network 420 receives a search query including a color attribute and includes a multi-head network with 16 attention heads.

According to some embodiments, attention network 420 is configured to generate an attention vector for the object based on the object features, wherein the attention network 420 takes a query vector based on the object features, and a plurality of key vector and a plurality of value vectors corresponding to a plurality of colors as input.

According to some embodiments, attention network 420 computes a query vector based on the object features and computes a key vector and a value vector corresponding to each of a set of colors. Additionally, or alternatively, the attention network 420 generates an attention vector for the object using an attention network 420 taking the query vector, the key vector and the value vector as input. The attention network 420 may be either software or hardware and can be stored in a memory or a combination of programs or include an application specific integrated circuit or other hardware implementation. Attention network 420 is an example of, or includes aspects of, the corresponding element described with reference to FIG. 5.

According to some embodiments, color classification network 425 generates a color attribute vector based on the attention vector, where the color attribute vector indicates a probability of the object including each of the set of colors. In some examples, color classification network 425 transmits information indicating one of the set of colors for the object based on the color attribute vector. The color attribute vector is a subset of general attribute vector which preserves semantic features and global contextual features. Color attribute could be correlated to other attributes, for example, texture, material, etc. The color attribute vector may be represented by a set of coordinates in key colors space.

In some examples, color classification network 425 averages the object features to produce color features, where key vector and the value vector are based on the color features. In some examples, color classification network 425 calculates color features based on a running mean with a momentum factor, where the key vector and the value vector are generated based on the color features.

According to some embodiments, color classification network 425 is configured to generate a color attribute vector based on the attention vector, wherein the color attribute vector indicates a probability of the object including each of the plurality of colors. According to some embodiments, color classification network 425 generates a color attribute vector using a color classification network 425 based on the attention vector, where the color attribute vector indicates a probability of the object including each of the set of colors. The color classification network 425 may be either software or hardware and can be stored in a memory or a combination of programs or include an application specific integrated circuit or other hardware implementation. Color classification network 425 is an example of, or includes aspects of, the corresponding element described with reference to FIG. 5.

The database 430 stores data in a specified format known as a schema. A database 430 may be structured as a single database 430, a distributed database 430, multiple distributed databases 430, or an emergency backup database 430. In some cases, a database 430 controller may manage data storage and processing in a database 430. In some cases, a user interacts with database 430 controller. In other cases, database 430 controller may operate automatically without user interaction. Database 430 is an example of, or includes aspects of, the corresponding element described with reference to FIG. 1.

Indexing, or search indexing, may be performed by the indexing component 435. Indexing is the process of structuring and parsing data to provide fast and accurate information retrieval. Files such as music, images, and text may be indexed based on associated tags or vector representations. When search indexing is performed, a computer program can search a large amount of information in a short period of time because the tags or vectors are compared rather than the information in the file itself. According to some embodiments, indexing component 435 is configured to index the images based on the color attribute vector.

A search engine 440 is a software system used for internet searches on the world wide web. The search engine performs a textual search based on a user input phrase or query, and outputs a list of related links or webpages related to the input. In some cases, the search engine may perform a systematic search and return images, video, text, or documents. For example, Google, Yahoo, or Bing are considered search engines. According to some embodiments, search engine 440 retrieves image search results from the indexed images based on the color attribute and searches the indexed images based on the color attribute vector. Search engine 440 is an example of, or includes aspects of, the corresponding element described with reference to FIG. 5.

According to some embodiments, word embedding network 445 is configured to encode object labels and encode a ground truth color attribute using a word embedding network 445. The word embedding network 445 may be either software or hardware and can be stored in a memory or a combination of programs or include an application specific integrated circuit or other hardware implementation. In some examples, the color corresponds to a human-perceived color of the object in the context of the image.

According to some embodiments, attribute prediction network 450 is configured to predict object labels, wherein the object detection network 415 is trained by comparing the encoded object labels and the predicted object labels.

According to some embodiments, attribute prediction network 450 computes a prediction loss based on the ground truth color attribute and the color attribute vector. In some examples, attribute prediction network 450 adjusts weights of the attention network 420 based on the prediction loss. In some examples, the prediction loss includes a weighted binary cross entropy loss, and where positive attributes are assigned with larger weights to alleviate the impact of false negative annotations. The prediction loss refers to a weighted binary cross entropy loss function used for multi-label classification. The prediction loss provides for pre-training the object detection model. The attribute prediction network 450 may be either software or hardware and can be stored in a memory or a combination of programs or include an application specific integrated circuit or other hardware implementation.

In some examples, attribute prediction network 450 predicts an attribute using an attribute prediction network 450 and computes an attribute loss by comparing the predicted attributed to the encoded ground truth color attribute. In some examples, attribute prediction network 450 adjusts weights of the object detection network 415 based on the attribute loss.

FIG. 5 shows an example of a color classification system architecture according to aspects of the present disclosure. The example shown includes object detection network 500, attention network 505, color classification network 510, and search engine 515.

Object detection network 500, attention network 505, color classification network 510, and search engine 515 are examples of, or includes aspects of, the corresponding element described with reference to FIG. 4.

FIG. 6 shows an example of an attention network according to aspects of the present disclosure. The example shown includes key color features 600, key vector 605, value vector 610, query bounding box features 615, query vector 620, inner product and softmax 625, matmul function 630, and classifier 635.

The key vector 605 is used to transform the reference colors to feature space. Key vectors 605 are extracted from the pre-trained network using pure RGB color images or mean features of sampled bounding boxes to match the reference colors to features from the images. A key vector 605 is updated along the training by back-propagation. The value vector 610 is a value obtained from key color features 600 using a linear transformation with learning parameters.

The attention vector includes the relation between the query object features and key color features 00. Attention vector designs the detection model using transformed keys and values from reference prior keys by linear key and value vectors 10.

Color attributes prediction preserves semantic features and global contextual features. Embodiments of the present disclosure include object detection based on deep convolutional networks with a backbone network to extract object features given the ground truth bounding boxes. The detection framework is pre-trained on a dataset which connects image concepts to language using the training and test splits of attribute prediction task to extract features that are object-aware and background-excluded. Binary cross entropy is used as the loss function for multi-label classification. A few negative labels are not negative but may not be annotated due to the human description attention from an image dataset. Therefore, a weighted binary cross entropy loss is adopted to emphasize the positive labels.

Attributes, for example, texture, materials, etc. could be correlated to colors. The object detection model is pre-trained with attribute loss, where attributes (i.e., 400 attributes) from a dataset are used which connect image concepts to language. The attribute prediction framework concatenates the box features and word embeddings of object labels.

Colors can be represented by sets of coordinates in key colors space. Therefore, the model produces a prediction based on the relations between the extracted features and key reference colors, i.e., color composition hypothesis. The color composition hypothesis may be tested by designing a module that learns the relation between key color examples and the query object. The testing may be achieved through the attention mechanism similar to memory networks. The color decomposition method attends to the fixed key reference colors.

The reference colors are transformed to the feature space to match the reference colors to the features from the images. The feature vectors are extracted for the key colors using pure RGB color images or mean features of sampled bounding boxes. According to the definition of color names and RGB values, pure RGB color images filled with monotonous RGB values and a center bounding box are fed into the feature extractor to obtain the primary key color vectors. Next, the features from the sampled bounding boxes with same color attribute are extracted and mean of the features is calculated for the representation of the key color. The calculation is adopted as the update with momentum $\lambda$ to save graphic memories and avoid the turbulence from sampling in the implementation:

$$k_c = \begin{cases} (1-\lambda)k_c + \lambda f_i, & \text{if } c \in y_i \\ k_c, & \text{otherwise} \end{cases} \quad (1)$$

where $k_c$ denotes the color vector key for attribute color c and is initialized from training features with respect to color labels extracted from pre-trained detection model before the training. The model is designed using the attentions as:

$$\tilde{f}_i = \sum_{c \in C} \frac{\exp\left(f_i^T \overline{k}_c\right)}{\sum_{c \in C} \exp\left(f_i^T \overline{k}_c\right)} \tilde{k}_c \quad (2)$$

where $\overline{k}_c$ and $\tilde{k}_c$ are transformed keys and values from reference prior keys $k_c$ by linear key vector 05 and value vector 10 respectively. Attention module with references to key color vectors includes the computation between query object feature $f_1$ and key color vector $\{k_c\}_{c \in C}$. Each key color vector $f_1$ denotes one key color corresponding to the color c in the total colors of prediction $C$. Value, key and query vector 20 are linear transformations with learning parameters. One embodiment uses multi-head attentions with 16 heads.

The key color vectors are fixed by extracting the vectors from pre-trained network to save the computations for feeding the pure color reference images during every training iteration. Variants of the model are explored using learnable keys since feature learners are not designed to handle pure color image resulting in a sub-optimal solution. Key color vectors are initialized with the calculated values and the key color vectors are updated by back-propagation along the training.

Color Decomposition

A method, apparatus, non-transitory computer readable medium, and system for color classification are described. One or more embodiments of the method, apparatus, non-transitory computer readable medium, and system include computing object features for an object in an image, computing a query vector based on the object features, computing a key vector and a value vector corresponding to each of a plurality of colors, generating an attention vector for the object using the query vector, the key vector and the value vector as input, generating a color attribute vector based on the attention vector, wherein the color attribute vector indicates a probability of the object including each of the plurality of colors, and transmitting information indicating one of the plurality of colors for the object based on the color attribute vector.

Some examples of the method, apparatus, non-transitory computer readable medium, and system described above further include computing image features for the image. Some examples further include identifying a bounding box for the object, wherein the object features are computed based on the image features and the bounding box.

Some examples of the method, apparatus, non-transitory computer readable medium, and system described above further include performing region-of-interest pooling on the image features based on the bounding box, wherein the object features are based on the region-of-interest pooling.

Some examples of the method, apparatus, non-transitory computer readable medium, and system described above further include identifying a single-color image for each of the plurality of colors. Some examples further include generating color features based on each of the plurality of single-color images, wherein the key vector and the value vector are based on the color features.

Some examples of the method, apparatus, non-transitory computer readable medium, and system described above further include identifying a plurality of objects having an object attribute corresponding to a color. Some examples further include generating object features for each of the plurality of objects. Some examples further include averaging the object features to produce color features, wherein key vector and the value vector are based on the color features.

Some examples of the method, apparatus, non-transitory computer readable medium, and system described above further include calculating color features based on a running mean with a momentum factor, wherein the key vector and the value vector are generated based at least in part on the color features. In some examples, the key vector and the value vector are computed independent of the image.

Some examples of the method, apparatus, non-transitory computer readable medium, and system described above further include indexing images in a database based on the color attribute vector. Some examples further include receiving a search query including a color attribute. Some examples further include retrieving image search results from the indexed images based on the color attribute. In some examples, the color corresponds to a human-perceived color of the object in the context of the image.

FIG. 7 shows an example of a process for information transmission of a color classification system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system computes object features for an object in an image. Object features can be detected using edges, corners, blobs, or ridges. In some cases, object features may be extracted from ground-truth bounding boxes using a convolutional neural network. Object features extracted are object-aware and background-excluded. In some cases, the operations of this step refer to, or may be performed by, an object detection network as described with reference to FIGS. 4 and 5.

At operation 705, the system computes a query vector based on the object features. The query vector can be the object feature vector, or it can include additional processing such as normalization or regularization. In some cases, the operations of this step refer to, or may be performed by, an attention network as described with reference to FIGS. 4 and 5.

At operation 710, the system computes a key vector and a value vector corresponding to each of a set of colors. The key vector is used to transform the reference colors to feature space. Key vectors are extracted from the pre-trained network using pure RGB color images or mean features of sampled bounding boxes to match the reference colors to features from the images. A key vector is updated along the training by back-propagation. The value vector is a value obtained from key color features using a linear transformation with learning parameters. In some cases, the operations of this step refer to, or may be performed by, an attention network as described with reference to FIGS. 4 and 5.

At operation 715, the system generates an attention vector for the object using the query vector, the key vector and the value vector as input. The attention vector includes the relation between the query object features and key color features. The attention vector includes the detection model using transformed keys and values from reference prior keys by linear key and value vectors. In some cases, the operations of this step refer to, or may be performed by, an attention network as described with reference to FIGS. 4 and 5.

At operation 720, the system generates a color attribute vector based on the attention vector, where the color attribute vector indicates a probability of the object including each of the set of colors. In some cases, the operations of this step refer to, or may be performed by, a color classification network as described with reference to FIGS. 4 and 5.

At operation 725, the system transmits information indicating one of the set of colors for the object based on the color attribute vector. The color attribute vector indicates a probability of the object including each of the plurality of colors. The color attribute vector is a subset of general attribute vector which preserves semantic features and global contextual features. Color attribute could be correlated to other attributes, for example, texture, material, etc. A color attribute vector may be represented by a set of coordinates in key colors space. In some cases, the operations of this step refer to, or may be performed by, a color classification network as described with reference to FIGS. 4 and 5.

Training

In FIG. 8, a method, apparatus, non-transitory computer readable medium, and system for color classification are described. One or more embodiments of the method, apparatus, non-transitory computer readable medium, and system include identifying a training set including an image representing an object and a ground truth color attribute for the image, computing object features for an object in an image using an object detection network, computing a query vector based on the object features, computing a key vector and a value vector corresponding to each of a plurality of colors, generating an attention vector for the object using an attention network taking the query vector, the key vector and the value vector as input, generating a color attribute vector using a color classification network based on the attention vector, wherein the color attribute vector indicates a probability of the object including each of the plurality of colors, computing a prediction loss based on the ground truth color attribute and the color attribute vector, and adjusting weights of the attention network based on the prediction loss.

Some examples of the method, apparatus, non-transitory computer readable medium, and system described above further include adjusting weights of the color classification network based on the prediction loss. In some examples, the prediction loss comprises a weighted binary cross entropy loss, and wherein positive attributes are assigned with larger weights to alleviate the impact of false negative annotations.

Some examples of the method, apparatus, non-transitory computer readable medium, and system described above further include generating image features using the object detection network. Some examples further include predicting an attribute using an attribute prediction network. Some examples further include encoding a ground truth color attribute using a word embedding network. Some examples further include computing an attribute loss by comparing the predicted attributed to the encoded ground truth color attribute. Some examples further include adjusting weights of the object detection network based on the attribute loss.

FIG. 9 shows an example of training a color classification system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies a training set including an image representing an object and a ground truth color attribute for the image. In some cases, the operations of this step refer to, or may be performed by, an object detection network as described with reference to FIGS. 4 and 5.

At operation 905, the system computes object features for an object in an image using an object detection network. The object features may include edges, corners, blobs, or ridges which denote an object with a high confidence. In some cases, the operations of this step refer to, or may be performed by, an object detection network as described with reference to FIGS. 4 and 5.

At operation 910, the system computes a query vector based on the object features. In some cases, the operations of this step refer to, or may be performed by, an attention network as described with reference to FIGS. 4 and 5.

At operation 915, the system computes a key vector and a value vector corresponding to each of a set of colors. The key vector is used to transform the reference colors to feature space. Key vectors are extracted from the pre-trained network using pure RGB color images or mean features of sampled bounding boxes to match the reference colors to features from the images. A key vector is updated along the training by back-propagation. The value vector is a value obtained from key color features using a linear transformation with learning parameters. In some cases, the operations of this step refer to, or may be performed by, an attention network as described with reference to FIGS. 4 and 5.

At operation 920, the system generates an attention vector for the object using an attention network taking the query vector, the key vector and the value vector as input. The attention vector includes the relation between the query object features and key color features. The attention vector designs the detection model using transformed keys and values from reference prior keys by linear key and value vectors. The attention vector may be related to an important object or feature. In some cases, the operations of this step refer to, or may be performed by, an attention network as described with reference to FIGS. 4 and 5.

At operation 925, the system generates a color attribute vector using a color classification network based on the attention vector, where the color attribute vector indicates a probability of the object including each of the set of colors. The color attribute vector is a subset of general attribute vector which preserves semantic features and global contextual features. Color attribute could be correlated to other attributes, for example, texture, material, etc. A color attribute vector may be represented by a set of coordinates in key colors space. In some cases, the operations of this step refer to, or may be performed by, a color classification network as described with reference to FIGS. 4 and 5.

At operation 930, the system computes a prediction loss based on the ground truth color attribute and the color attribute vector. The prediction loss refers to a weighted binary cross entropy loss function used for multi-label classification. The prediction loss provides for pre-training the object detection model. In some cases, the operations of this step refer to, or may be performed by, an attribute prediction network as described with reference to FIG. 4.

At operation 935, the system adjusts weights or biases of the attention network based on the prediction loss. The adjusted weights or biases may be used for a next color classification and may improve the performance of classifying colors. In some cases, the operations of this step refer to, or may be performed by, an attribute prediction network as described with reference to FIG. 4.

Evaluation

One or more embodiments of the present disclosure include the baseline of a color histogram built on an HSV color histogram. 256*8*8 HSV bins are adopted by preserving values on the hue channel which contains color-related information and grouping saturation and value channels into 8 bins each. A 2D convolutional kernel of size 3*8*8 is applied to aggregate histogram features into 1D vector. Next, a neural network model where 2D convolutional kernels are replaced by 1D convolutional kernels with symmetrical padding is used to extract the features. A fully connected layer is connected before the classifier 35 since spatial location along the hue channel is used for color recognition.

The object names are used for the prediction. The prediction is dependent on the color distribution for the object category within training data set. Embodiments of the present disclosure test the models on images and illustration dataset. The HSV color histogram model results in 63.92% and 68.52% precision@1 on the tested datasets. The histogram only model results in loss of semantic and contextual information. Color attributes are affected by human visual attention and language attention, which are related to semantic information. The color histogram from object region could vary as environmental lighting and photography filter change, resulting in loss of contextual information. Humans describe the original colors of objects despite changes in environmental lighting or photography filters. The color-decomposition model outperforms the baselines and the attention shows strong connection between the object color and keys and any combinations of sufficient number of colors (3 or more) perform similarly.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a query with a color term corresponding to a reference color;
computing object features for an object in an image;
computing a query vector based on the object features;
obtaining a key vector that transforms the reference color to color features in a feature space of the object features, wherein the key vector is obtained independent of the image;
generating a color attribute vector using a machine learning model that performs an attention mechanism based on the key vector and the query vector, wherein the color attribute vector indicates a probability of the object including the reference color; and
transmitting a response indicating that the image matches the query based on the color attribute vector.

2. The method of claim 1, further comprising:
computing image features for the image; and
identifying a bounding box for the object, wherein the object features are computed based on the image features and the bounding box.

3. The method of claim 2, further comprising:
performing region-of-interest pooling on the image features based on the bounding box, wherein the object features are based on the region-of-interest pooling.

4. The method of claim 1, further comprising:
identifying a single-color image for each of a plurality of colors; and
generating the color features based on each of a plurality of single-color images, wherein the key vector and a value vector are based on the color features.

5. The method of claim 4, wherein:
one of the plurality of colors corresponds to a human-perceived color of the object in context of the image.

6. The method of claim 1, further comprising:
identifying a plurality of objects having an object attribute corresponding to a color;
generating object features for each of the plurality of objects; and
averaging the object features to produce the color features, wherein the key vector and a value vector are based on the color features.

7. The method of claim 1, further comprising:
calculating color features based on a running mean with a momentum factor, wherein the key vector and a value vector are generated based at least in part on the color features.

8. The method of claim 1, wherein:
the key vector and a value vector are computed independent of the image.

9. The method of claim 1, further comprising:
indexing images in a database based on the color attribute vector;
receiving a search query including a color attribute; and
retrieving image search results from the indexed images based on the color attribute.

* * * * *